US008281291B2

(12) United States Patent
Dmitrovich et al.

(10) Patent No.: US 8,281,291 B2
(45) Date of Patent: Oct. 2, 2012

(54) SYSTEM AND METHOD FOR EMBEDDED JAVA MEMORY FOOTPRINT PERFORMANCE IMPROVEMENT

(75) Inventors: Janet Dmitrovich, Round Rock, TX (US); Philip Lee Langdale, Austin, TX (US); James Patrick Robbins, Austin, TX (US); William J. Tracey, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1312 days.

(21) Appl. No.: 11/967,142

(22) Filed: Dec. 29, 2007

(65) Prior Publication Data

US 2008/0098265 A1 Apr. 24, 2008

Related U.S. Application Data

(63) Continuation of application No. 10/763,090, filed on Jan. 22, 2004, now abandoned.

(51) Int. Cl.
 *G06F 9/45* (2006.01)
(52) U.S. Cl. ......... 717/148; 717/140; 717/151; 717/153
(58) Field of Classification Search ........................ None
 See application file for complete search history.

(56) References Cited

U.S. PATENT DOCUMENTS

| 3,800,291 | A | 3/1974 | Cocke et al. | 711/202 |
| 4,446,517 | A | 5/1984 | Katsura et al. | 712/245 |
| 4,868,738 | A | 9/1989 | Kish et al. | 710/26 |
| 5,832,205 | A | 11/1998 | Kelly et al. | 714/53 |
| 6,324,686 | B1 | 11/2001 | Komatsu et al. | 717/5 |
| 6,598,141 | B1 | 7/2003 | Dussud et al. | 711/170 |
| 6,813,764 | B2 * | 11/2004 | Stoodley | 717/153 |
| 6,862,650 | B1 | 3/2005 | Matthews et al. | 711/6 |
| 6,990,558 | B2 | 1/2006 | Henry et al. | 711/137 |
| 7,089,544 | B2 * | 8/2006 | Hickson | 717/148 |
| 7,353,504 | B2 * | 4/2008 | Lagergren | 717/151 |
| 7,587,712 | B2 * | 9/2009 | Mountain et al. | 717/148 |
| 7,665,076 | B2 * | 2/2010 | Clement et al. | 717/148 |

(Continued)

OTHER PUBLICATIONS

Atienza et al., Dynamic Memory Management Design Methodology for Reduced Memory Footprint in Multimedia and Wireless Network Applications, Feb. 2004, 6 pages, <http://delivery.acm.org/10.1145/970000/969031/208510532.pdf>.*

(Continued)

*Primary Examiner* — Thuy Dao
(74) *Attorney, Agent, or Firm* — VanLeeuwen & VanLeeuwen; Jeffrey S. LaBaw

(57) ABSTRACT

A system and method are provided to allow demand loading and discarding of Java executable image (JXE) files. The virtual machine allocates an address space for a requested JXE program. The read-only portion of the JXE file is memory mapped from its nonvolatile location to the allocated memory space using read-only mapping and the read/write section of the JXE file are loaded into memory. When a page of the JXE program is needed, a page fault occurs if the read-only portion has not been loaded into memory. The operating system's page fault handler retrieves the needed page(s) from the nonvolatile storage location based upon the mapping data that resulted from the previously performed memory mapping. Because the read-only section of the JXE file is memory mapped using read-only mapping, the operating system's paging process is free to discard previously loaded memory pages that contain read-only portions of the JXE file.

20 Claims, 10 Drawing Sheets

U.S. PATENT DOCUMENTS

| | | | | |
|---|---|---|---|---|
| 7,865,885 B2* | 1/2011 | Wu et al. | | 717/151 |
| 8,024,704 B2* | 9/2011 | Meijer | | 717/116 |
| 8,108,844 B2* | 1/2012 | Crutchfield et al. | | 717/149 |
| 2002/0029357 A1 | 3/2002 | Charnell et al. | | |
| 2002/0144240 A1 | 10/2002 | Lueh et al. | | 717/136 |
| 2002/0184618 A1 | 12/2002 | Bala et al. | | 717/148 |
| 2003/0135789 A1 | 7/2003 | DeWitt et al. | | 714/38 |
| 2004/0167945 A1 | 8/2004 | Garthwaite | | 707/206 |
| 2004/0221126 A1 | 11/2004 | Peinado et al. | | 711/203 |
| 2005/0114848 A1* | 5/2005 | Choi et al. | | 717/148 |
| 2005/0183077 A1* | 8/2005 | Langdale et al. | | 717/148 |
| 2006/0059474 A1* | 3/2006 | Bhansali et al. | | 717/151 |
| 2006/0101434 A1* | 5/2006 | Lake et al. | | 717/140 |
| 2006/0212844 A1 | 9/2006 | Goldin et al. | | 717/106 |
| 2008/0098265 A1* | 4/2008 | Dmitrovich et al. | | 714/710 |
| 2009/0031292 A1* | 1/2009 | Fulton et al. | | 717/151 |
| 2010/0192139 A1* | 7/2010 | Titzer et al. | | 717/151 |

OTHER PUBLICATIONS

Ertl et al., Retargeting JIT Compilers by using C-Compiler Generated Executable Code, Sep. 2004, 10 pages, <http://delivery.acm.org/10.1145/1030000/1025995/22290041.pdf>.*

Cierniak et al., "Briki: an Optimizing Java Compiler," Compcon '97 Proceedings, IEEE, Feb. 23-26, 1997, pp. 179-184.

Bothner, "A Gcc-based Java Implementation," Compcon '07 Proceedings, IEEE, Feb. 23-26, 1997, pp. 174-178.

Factor et al., "JavaSplit: A Runtime for Execution of Monolithic Java Programs on Heterogeneous Collections of Commodity Workstations," Proceedings of the IEEE International Conference, 2003.

Office action for U.S. Appl. No. 10/777,908, mailed Aug. 14, 2008, 13 pages.

* cited by examiner

SYSTEM AND METHOD FOR EMBEDDED JAVA MEMORY FOOTPRINT PERFORMANCE IMPROVEMENT

RELATED APPLICATIONS

This application is a continuation application of U.S. Non-Provisional patent application Ser. No. 10/763,090, now abandoned entitled "System and Method for Embedded Java Memory Footprint Performance Improvement," filed on Jan. 22, 2004.

BACKGROUND OF THE INVENTION

1. Technical Field

The present invention relates in general to a system and method for improving memory usage for Java executable (JXE) files. More particularly, the present invention relates to a system and method for memory mapping the read-only portion of the JXE file so that the operating system can reclaim the memory when needed.

2. Description of the Related Art

Pervasive computing devices are available to perform a wide variety of tasks in today's business arena. Semiconductor technology has enabled devices such as mobile telephones and personal digital assistants (PDAs) to perform tasks that, until recently, were reserved for more traditional computers.

These pervasive computing devices include more powerful operating systems. Some of these operating systems support middleware applications, such as "virtual machines" that are adapted to run platform-neutral applications. A popular example of a virtual machine is the Java Virtual Machine (JVM). Programs written to execute using a JVM will operate on any JVM regardless of the underlying hardware and operating system used by the computing device. Underlying operating systems include Microsoft's Windows™ based operating systems as well as Unix-based operating systems such as IBM's AIX operating system and the Linux operating system.

One challenge that is encountered when running an embedded virtual machine on many pervasive computing devices, especially smaller pervasive computing devices, is the smaller amount of available memory on these devices. This challenge is being addressed by the introduction of pre-linked executable images of the applications written for the virtual machine environment. In the Java environment, these pre-linked executable images are referred to as "JXE" files. The Jxe file wraps the Java classes into one executable file, which makes the startup and distribution of Java programs easier.

While using JXE files improves the startup and distribution of Java programs, it adds particular memory challenges. When running a JXE file from a filesystem, the entire JXE image is loaded into memory in order to execute the program. Thus, using JXE files requires the computing device to have sufficient amounts of memory to store and load into RAM all of the bytecodes included in the JXE file. This can be especially challenging when a user is using multiple JXE files on a smaller pervasive computing device, with each JXE file needing to be loaded into the limited amount of available memory.

JXE files include both read-only data, such as the bytecodes, and read/write data, such as the variables used by the program. Because of this, the memory in which the JXE file resides is typically not swappable without first writing all the JXE data stored in memory back to nonvolatile storage, such as a hard disk drive. This is the case even though the read/write portion of the JXE file is often quite small in comparison to the read-only portion of the file. Swapping the entire JXE file out to disk takes considerable computing resources and decreases system performance. In addition, many pervasive computing devices do not have swap space to even allow swapping of the JXE file. Likewise, when the application is subsequently needed, having to read the entire JXE file from disk and load it back into memory is also expensive in terms of time and computing resources.

What is needed, therefore, is a system and method for allowing page faults to occur with the read-only portion of JXE files using an operating system that supports paging. What is further needed is a system and method to load JXE pages when needed and allow the operating system to discard JXE pages according to the system's normal paging process.

SUMMARY

It has been discovered that read-only portions of Java executable image (JXE) files can be memory mapped from their nonvolatile storage location to a memory location using read-only mapping. In this manner, the operating system is free to discard memory pages occupied by the read-only section of the JXE file without having to instruct the filesystem to write the JXE file back to the nonvolatile storage.

When a JXE program request is made, the virtual machine allocates an address space for the program. The JXE file is then memory mapped from its nonvolatile location to the allocated memory space. In addition, the read/write section (i.e., variables) of the JXE file are loaded into memory.

When the JXE program is initialized, a page fault occurs because the read-only portion has not yet been loaded into memory. The operating system's page fault handler retrieves the needed page(s) from the nonvolatile storage location based upon the mapping data that resulted from the previously performed memory mapping. When subsequent pages are needed that have not yet been loaded, they too cause page faults that are handled by the operating system's page fault handler. Because the read-only section of the JXE file is memory mapped using read-only mapping, the operating system's paging process is free to discard previously loaded memory pages that contain read-only portions of the JXE file. When pages that have been discarded by the operating system are once again needed, another page fault occurs whereupon the code is loaded by the page fault handler.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
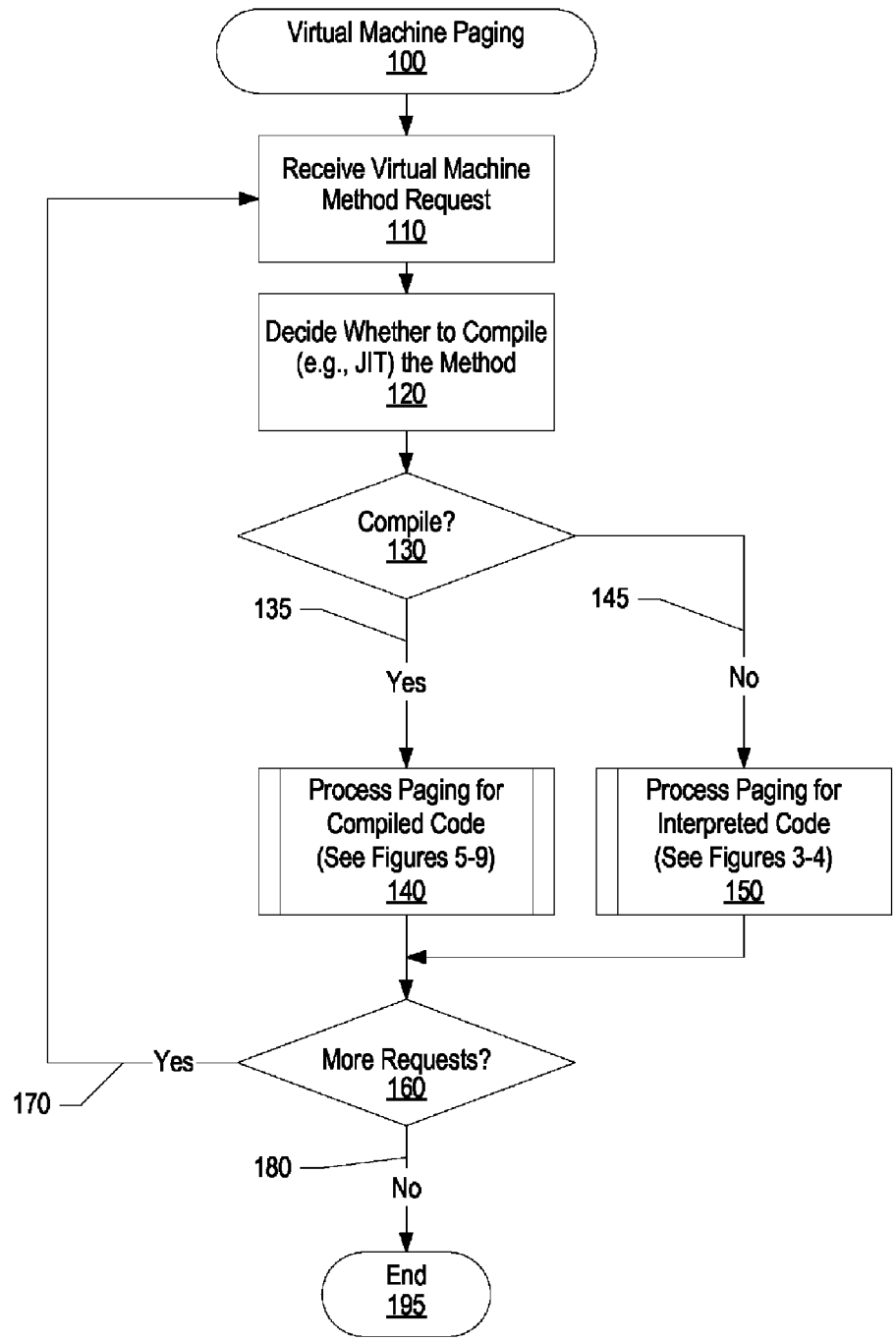
FIG. 1 is a high level flowchart showing how virtual machine code can be compiled or interpreted with each type of code being effectively paged in order to manage memory.

FIG. 1 is a high level flowchart showing how virtual machine code can be compiled or interpreted with each type of code being effectively paged in order to manage memory. Processing commences at 100 whereupon, at step 110, the virtual machine, such as a Java Virtual Machine (JVM), receives a request to execute a virtual machine application, such as an applet or other method that includes bytecode.

At step 120, the virtual machine decides whether to compile the requested method, using a Just-in-Time (JIT) compiler, or whether to execute the method by interpreting the bytecode that comprises the method. This decision is based upon a variety of factors, such as how often the method is requested.

A determination is made as to whether to compile the method using the virtual machine's Just-in-Time compiler (decision 130). If the method is to be compiled using the virtual machine's JIT compiler, decision 130 branches to "yes" branch 135 whereupon a paging process is performed to keep track of the JITed code pages and recompile the JITed code if the JITed code pages are reclaimed by the operating system (predefined process 140, see FIGS. 5-9 and corresponding text for processing details). On the other hand, if the requested method is being interpreted rather than compiled, decision 130 branches to "no" branch 145 whereupon a paging process is performed that memory maps the interpretable code to a nonvolatile storage location and reads in pages from the nonvolatile storage location when needed (predefined process 150, see FIGS. 3-4 and corresponding text for processing details).

A determination is made as to whether there are more method requests for the virtual machine to process (decision 160). If there are more requests, decision 160 branches to "yes" branch 170 whereupon processing loops back to receive and process the next request. This looping continues until there are no more requests to process (i.e., the computer system and/or the virtual machine is shutdown), at which point decision 160 branches to "no" branch 180 and processing ends at 195.

Figure 2:
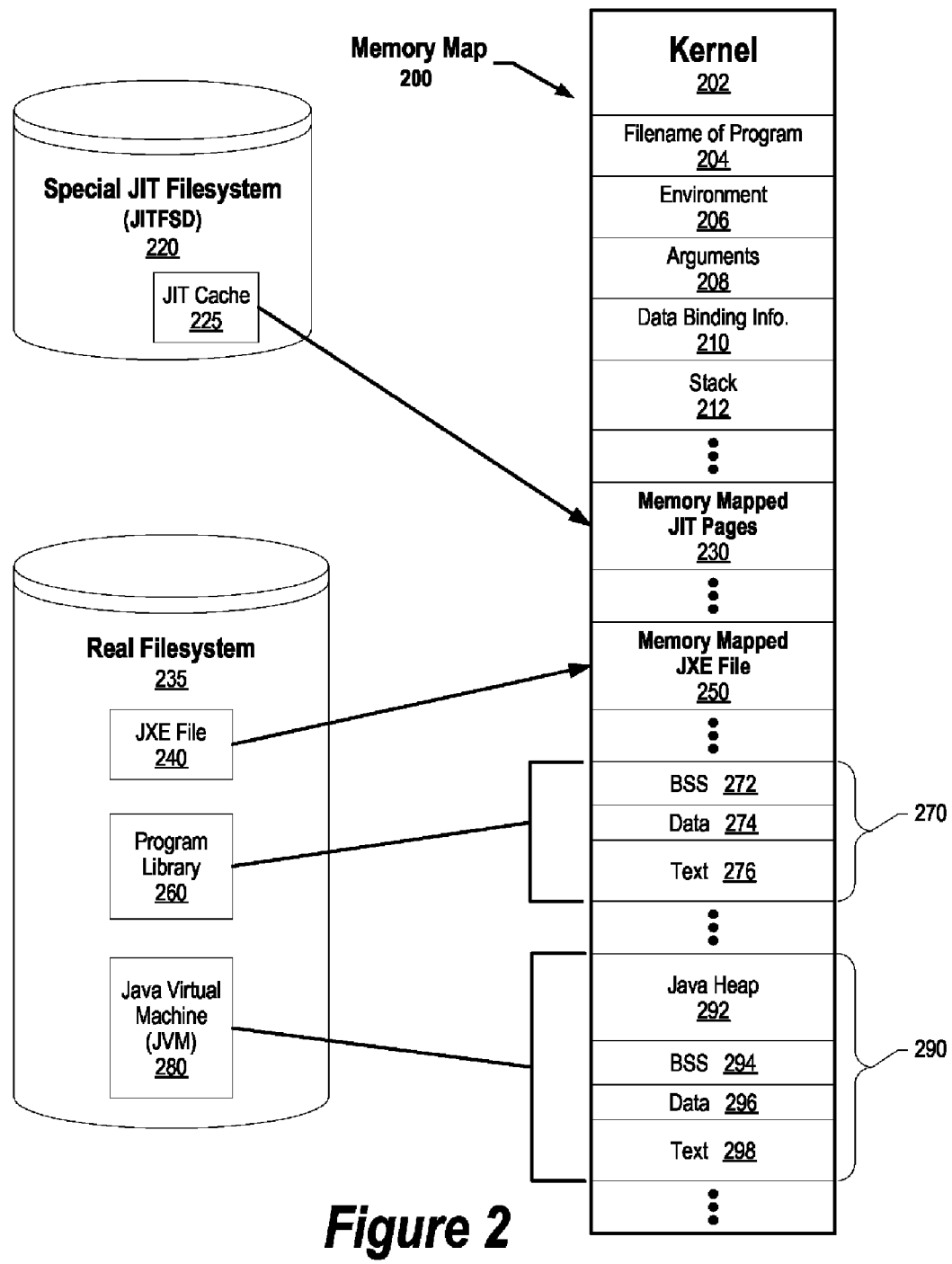
FIG. 2 is a memory map of a Unix-type operating system which includes memory mapped JITed pages as well as a memory mapped Java Executable Image (JXE) file.

FIG. 2 is a memory map of a Unix-type operating system which includes memory mapped JITed (compiled) pages as well as a memory mapped interpretable Java Executable Image (JXE) file. Memory map 200 includes a variety of processes and data. Kernel 202 is the kernel of the operating system. Filename of program 204 is a memory location in which the name of the program is stored. Environment 206 includes environment settings for the program. Arguments 208 are parameters that are passed to the program. Data binding information 210 is information used to bind data that is read or written by the program. Stack 212 is a FIFO memory that stores the program stack for the program.

Memory mapped JIT pages 230 are memory pages used by the JIT compiler to store compiled programs. As shown, the JIT pages are memory mapped to JIT cache 225 that is maintained by special JIT filesystem 220 (JIT filesystem driver, or JITFSD). A mapping is maintained to identify the method name that corresponds to JIT pages. The JIT filesystem is a limited filesystem that memory maps the compiled JIT program to a cache within the JIT filesystem. When the memory manager running in the operating system (i.e., the kernel) needs more space, it determines that one or more of the memory mapped JIT pages can be reclaimed and requests that the JIT filesystem write the data from memory back to the JIT filesystem. Acting as a special filesystem, the JIT filesystem does not actually write the data from the memory mapped JIT pages back to the JIT cache. Instead, the JIT filesystem simply replies that the operation completed successfully whereupon the operating system reclaims the pages. When a branch is subsequently made to an instruction that existed in one of the reclaimed pages, a page fault occurs. The operating system responds to the page fault by requesting that the special JIT filesystem reload the page(s). However, since the special filesystem never wrote the page(s) to nonvolatile storage in the first place, the special filesystem does not have the code that belongs in the page(s). Instead, the special filesystem initializes the pages and writes an invalid operation code (opcode) to the initialized pages. In one embodiment, the invalid opcode is x'00' and is written to the entire page (or pages). In this manner, regardless of the instruction being branched to on the page, the instruction is always the same invalid (i.e., x'00') instruction. The special filesystem then returns a response to the operating system indicating that the page(s) was/were successfully loaded. The operating system then tries to re-execute the instruction that caused the page fault. Now, however, the system encounters an invalid opcode, causing a special error handler to be called to handle the invalid opcode. The error handler uses mapping data to determine which method used to reside at the discarded page(s) and recompiles the method (using the JIT compiler) and stores the recompiled code back to the same memory mapped JIT pages that stored the original compiled code (i.e., the error handler recreates the compiled code and stores it in the same location that it occupied before the pages were discarded). The address that originally caused the page fault is branched to once again, however this time the recompiled code occupies the pages and the instructions execute successfully.

The read-only portion of a Java Executable Image (JXE) file 240 stored in nonvolatile storage managed by real filesystem 235 is memory mapped "read-only" to memory address 250 in memory map 200. Because the file is mapped "read-only," the operating system is free to reclaim the memory space (250) in which the JXE resides in the memory map as no dynamic data, such as variables, are stored in memory address range 250. When code within discarded pages is called, the operating system's page fault handler reads the needed page from nonvolatile storage location 240 to which the memory page is mapped.

Program library 260, such as a C Program Library, is stored in nonvolatile storage managed by filesystem 235. The library is stored to memory region 270 in three memory areas. BSS (Block Started by Symbol) memory area 272 includes uninitialized data segments produced by a linker operating in a Unix-type operating environment. An uninitialized data segment has a name and a size but no value (until a value is set by the program). Data memory area 274 includes initialized data, such as variables, that have a name, size and a value. Text memory area 276 includes the program code (i.e., the instructions used to perform the library functions).

Java virtual machine 280 is a program that is also managed by filesystem 235. The program is stored to memory region 290 in four memory areas. Java heap 292 is a memory region used to store objects managed by the Java Virtual Machine (JVM) program. BSS memory area 294 stores uninitialized data segments, data memory area 296 stores initialized data, and text memory area 298 stores the program code for the JVM program.

Figure 3:
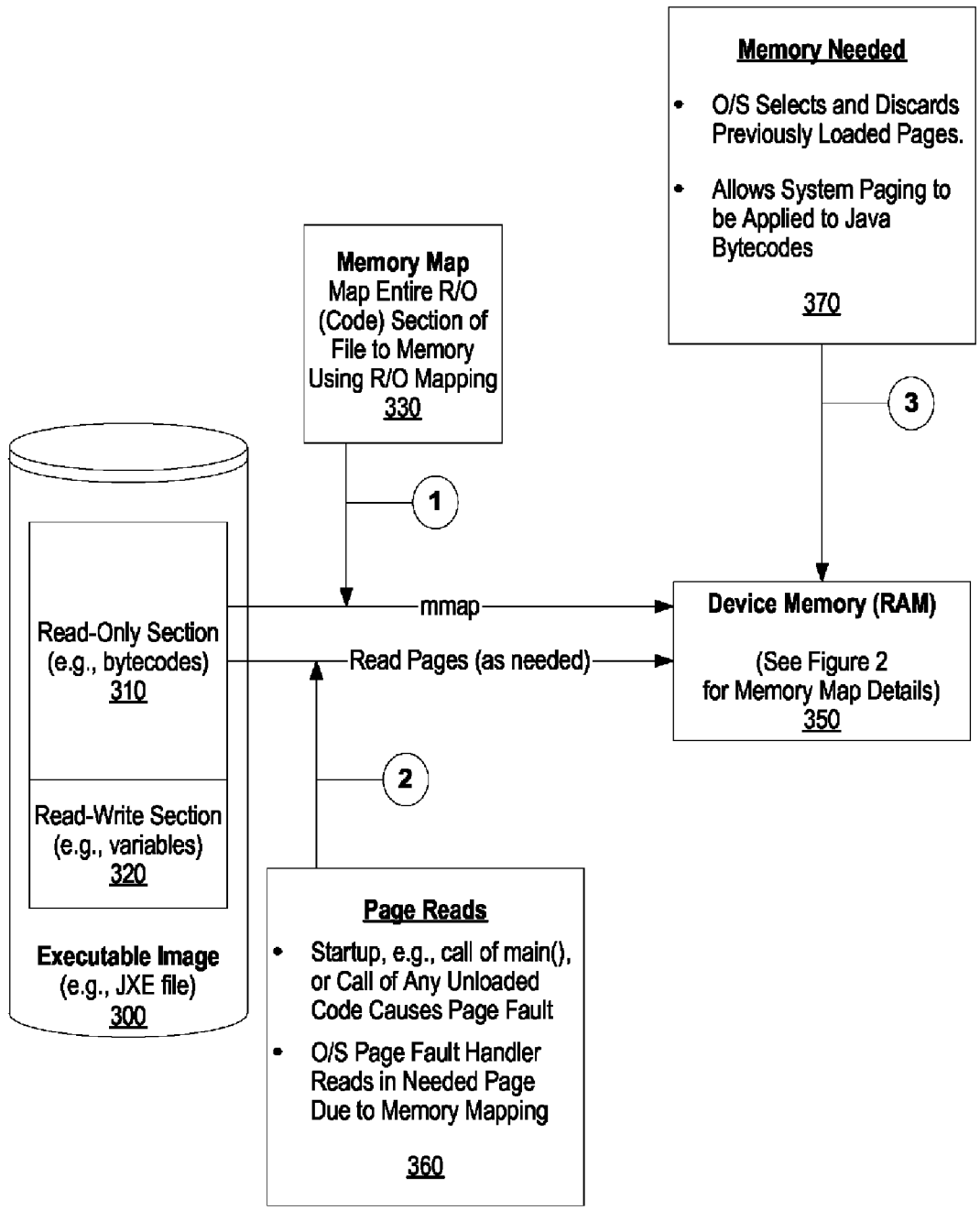
FIG. 3 is a diagram showing memory mapping, page reads, and memory reclamation of a Java Executable Image (JXE) file.

FIG. 3 is a diagram showing memory mapping, page reads, and memory reclamation of a Java Executable Image (JXE) file. Executable image (JXE file) 300 is stored in nonvolatile storage and includes two sections. The first section is read-only section 310 that includes static instructions such as Java bytecodes. The second section is read-write section 320 that includes dynamic data, such as variables, that need to be both read and written.

The first process (step 330) memory maps the read-only section of the executable image (i.e., the bytecodes) to memory location 350 (see FIG. 2, memory mapped location 240, and corresponding text for further detail). Read-only mapping is used so that the operating system's paging process will be able to discard pages without first needing to request that the pages be swapped out to nonvolatile storage.

The second process (step 360) occurs when instructions in any of the memory mapped pages are called before the page is loaded into memory. When the program is started, the initial instruction of the code is called. Because that code has not yet been written to device RAM 350, a page fault occurs. The operating system's page fault handler uses the memory mapping that was performed in the first step in order to fetch the needed page(s) and write the page(s) to memory 350.

The third process (step 370) only occurs if the operating system needs to reclaim memory. When the operating system needs additional memory, a paging process is used to identify least-recently used pages from memory 350. If the identified least-recently used pages are pages that have been memory mapped to read-only section 310 of the Java executable, then the pages are simply discarded and the memory reused. The pages are not written back to nonvolatile storage because the pages have been memory mapped (mmap-ed) to read-only section 310 as read-only pages, indicating that the pages are static and can be discarded without losing data that already exists on the nonvolatile storage device.

Figure 4:
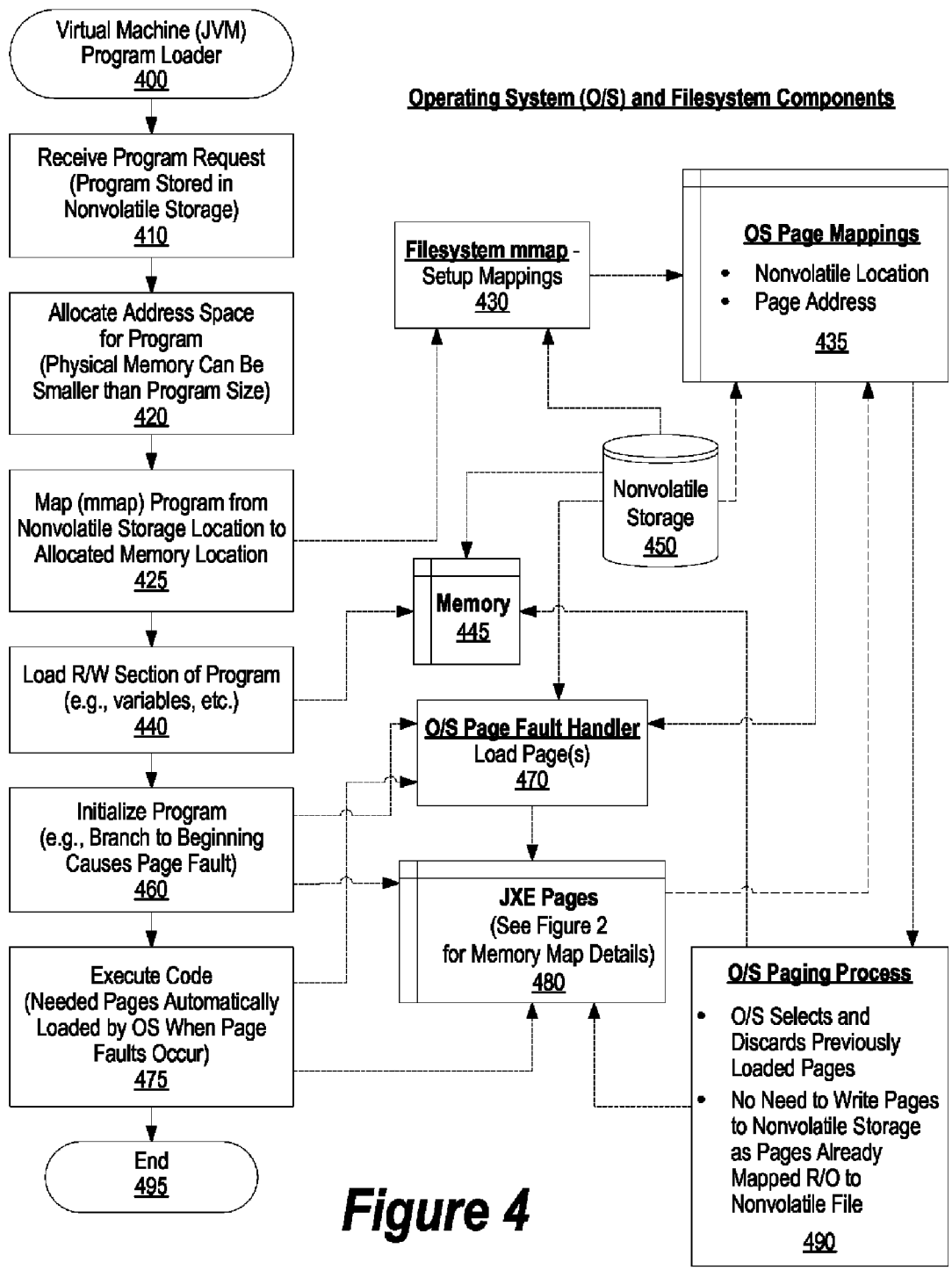
FIG. 4 is a flowchart showing the steps taken to load a Java Executable Image (JXE) file, mapping the file to an allocated memory area, and loading pages from the JXE file into the allocated memory when a page fault occurs.

FIG. 4 is a flowchart showing the steps taken to load a Java Executable Image (JXE) file, mapping the file to an allocated memory area, and loading pages from the JXE file into the allocated memory when a page fault occurs. The processing of the virtual machine program loader, such as the JVM program loader, commences at 400. At step 410, the program loader receives a request to load a program that is currently stored in nonvolatile storage 450.

At step 420, the loader allocates address space for the program being loaded. The actual amount of physical memory allocated can be smaller than the program size as pages of the program will be read into the allocated address space when needed. The loader memory maps (mmaps) the read-only section of the program stored on nonvolatile storage to the allocated address space at step 425 and indicates that the mapping is read-only mapping. The filesystem being used by the operating system performs the memory mapping (step 430) and stores nonvolatile locations and corresponding page addresses in operating system page mapping table 435. At step 440, the loader also loads the read/write section of the program into memory 445. The read/write section of the program is not memory mapped because this section includes dynamic elements, such as variables, that would need to be swapped (i.e., stored back to the nonvolatile storage device) before the pages used by the read/write section can be discarded and reused.

At step 460, the program whose data has been loaded and whose read-only section (i.e., the bytecode data) has been memory mapped is initialized. However, when processing branches to the beginning of the program (i.e., the page/address where the program is supposed to reside), a page fault occurs because the page of the program has not yet been read from nonvolatile storage and loaded in memory 480 (see FIG. 2, location 250, and corresponding text for a description of the memory used to store the JXE file). The page fault results in the operating system's page fault handler 470 being invoked and loading the needed page(s). Page fault handler 470 reads the memory mapping data stored in mapping table 435 to determine where in the nonvolatile storage the requested page resides. The page fault handler reads the data from the nonvolatile storage locations and writes the data to the page addresses within memory 445 that have been allocated for the nonvolatile location.

At step 475, the code is executed. When an instruction is called that has not yet been loaded from nonvolatile storage 450, the page fault handler once again retrieves the needed pages by checking the page mappings and identifying the nonvolatile storage location that corresponds to the page address being called, reading the needed page(s) from nonvolatile storage, and writing the page(s) to the appropriate allocated address space in JXE memory space 480.

Throughout the execution of the program, operating system paging process 490 is able to select and discard previously loaded JXE pages. The discarded JXE pages are not written back to nonvolatile storage before being discarded because the paging process recognizes that the pages are already mapped read-only to a nonvolatile storage location. When discarded pages are once again needed, a page fault occurs and page fault handler 470 takes care of retrieving and loading the needed page(s) as described above.

Figure 5:
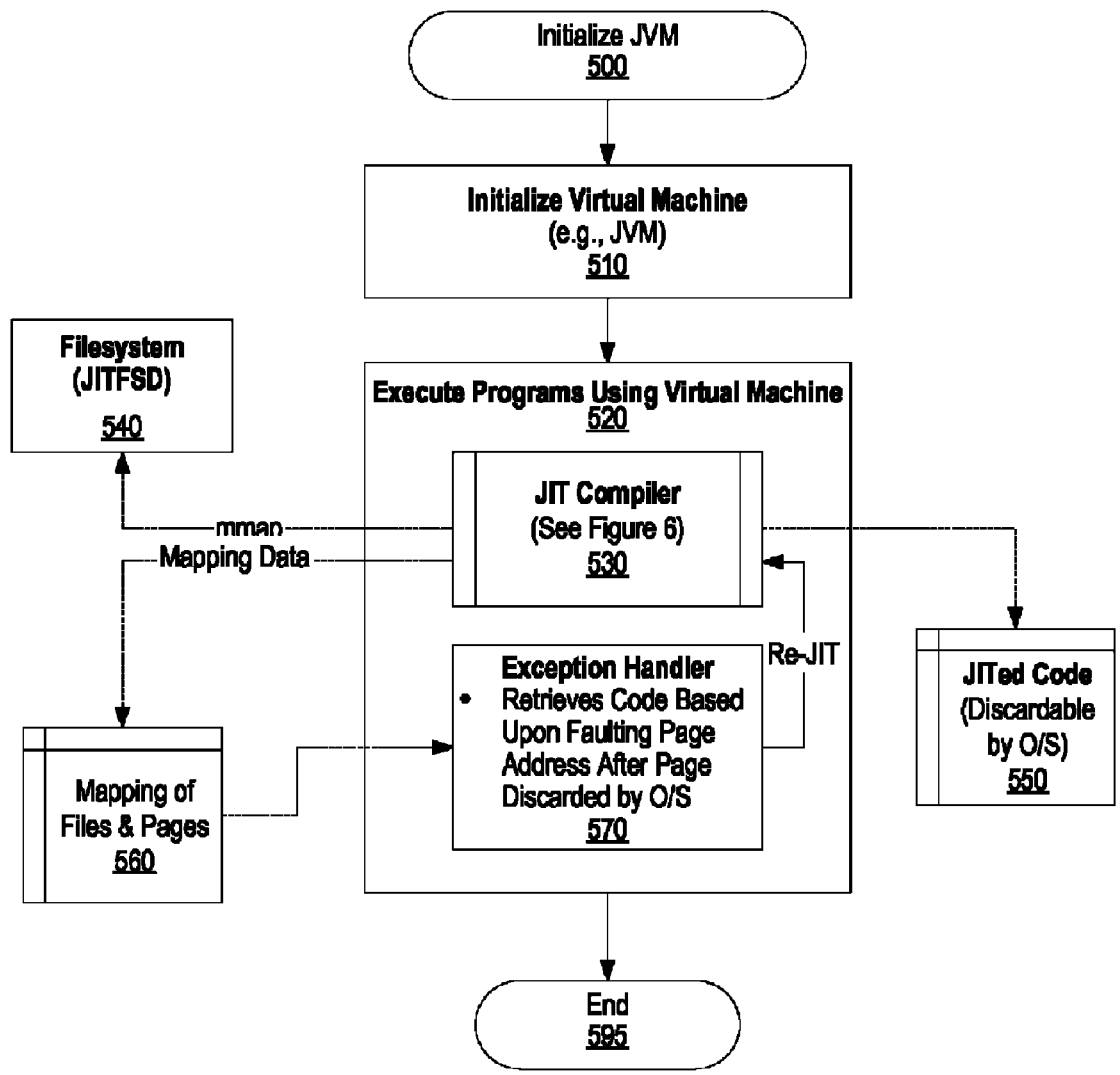
FIG. 5 is a high level flowchart showing a virtual machine being initialized and executing programs, some of which are compiled using a Just-in-Time (JIT) compiler.

FIG. 5 is a high level flowchart showing a virtual machine being initialized and executing programs, some of which are compiled using a Just-in-Time (JIT) compiler. The virtual machine processing commences at 500 whereupon, at step 510, the virtual machine, such as a Java Virtual Machine (JVM) is initialized.

At step 520, programs (such as applets) that run within the virtual machine environment are executed. Some programs are interpreted using the virtual machine's interpreter. However, based on a variety of factors including program usage statistics, the virtual machine may decide to compile a program using a Just-In-Time (JIT) compiler (predefined process 530, see FIG. 6 and corresponding text for processing details). The compiled JIT program (JITed code 550) is stored in memory and memory mapped using a special JIT filesystem (JITFSD 540). During the compilation process, a mapping is maintained that maps the JITed code pages back to the method (i.e., the program name) that correspond to the JITed code. The mapping data is stored in mapping table 560.

The operating system is able to discard pages occupied by JITed code 550. Because the JITed code is memory mapped to a file using the special filesystem, the operating system instructs the special filesystem to write pages of JITed code that are about to be discarded to nonvolatile storage. The special filesystem does not write the pages to the nonvolatile storage, but informs the operating system that the pages were written successfully. When a branch is subsequently made to an address included in one of the discarded pages, a page fault occurs. The operating system responds by instructing the special filesystem to load the page(s). Because the special filesystem never actually swapped the pages in the first place, it does not have the data needed to load the pages. Instead, the special filesystem loads the memory pages with one or more occurrences of a special invalid operation code (opcode) and informs the operating system that the code was loaded successfully. Now, when the operating system attempts to branch to the code, an invalid operation exception occurs. The invalid operation exception is handled by error handler 570 which retrieves the name of the program (i.e., the method name) that corresponds to the faulting pages and either interprets the instructions or instructs the JIT compiler to recompile the program and store the program at the memory address that corresponds to the method in mapping data 560.

The virtual machine (or the entire computer system) is eventually shutdown. At this point, virtual machine processing ends at 595.

Figure 6:
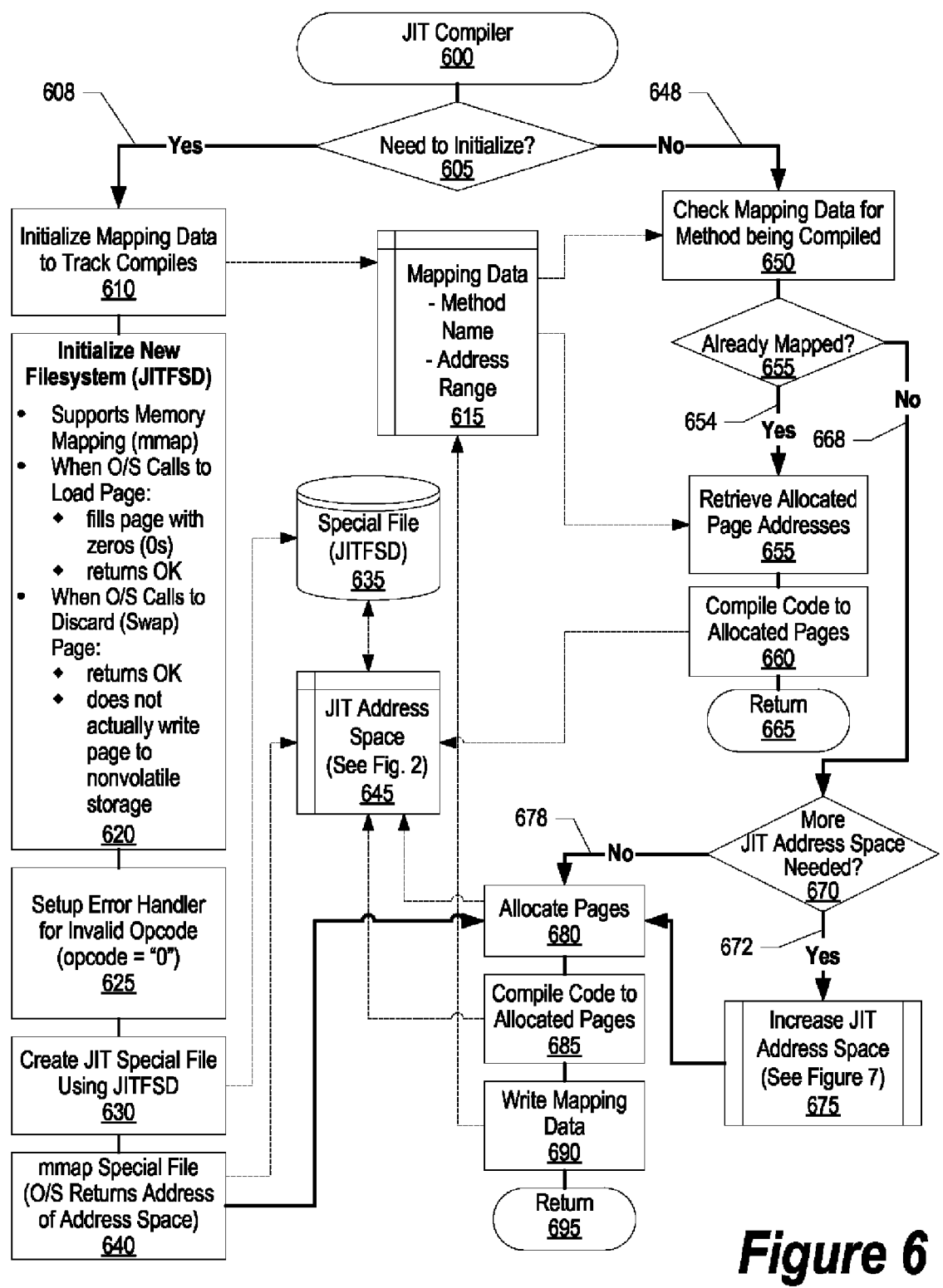
FIG. 6 is a flowchart showing steps taken by the JIT compiler when a Java program running by the Java Virtual Machine (JVM) is compiled.

FIG. 6 is a flowchart showing steps taken by the JIT compiler when a Java program running by the Java Virtual Machine (JVM) is compiled. JIT compiler processing commences at 600 whereupon a determination is made as to whether the JIT compiler needs to be initialized (decision 605). If the JIT compiler needs to be initialized, decision 605 branches to "yes" branch 608 in order to initialize the JIT compiler.

Initialization of the JIT compiler begins at step 610 where mapping data structure 615, used to track JIT compilations, is initialized. At step 620, the special filesystem that is used for memory mapping JITed code is initialized. The special filesystem supports memory mapping (the mmap instruction). When the operating system instructs the special filesystem to load a page of data, the special filesystem fills all or a part of the page with an invalid operation code (opcode) and returns a successful completion code. In one embodiment, the special invalid opcode is x'00'. When the special filesystem is called upon to write one or more pages from memory back to nonvolatile storage, the special filesystem returns a successful completion code without actually writing the code to nonvolatile storage.

At step 625, an error handler is registered with the operating system to handle the invalid opcode (e.g., x'00') that is written to pages loaded with the special filesystem. At step 630, a special file (file 635) is created using the special filesystem and, at step 640, the entire special file is memory mapped (mmap-ed) whereupon the operating system returns an address space (JIT address space 645, see FIG. 2, address space 230, and corresponding text for more details). The JIT compiler uses this address space for storing all JITed code resulting from the JIT compiler.

At step 680, the JIT compiler allocates pages within JIT address space 645 for storing the code resulting from compiling the code. At step 685, the JIT compiler compiles the code and writes the resulting compiled code to the allocated pages that reside within the JIT address space. At step 690, mapping data such as the program name (i.e., method name) and the address range are written to mapping data 615 and processing returns to the routine that called the JIT compiler at 695.

Returning to decision 605, if the JIT compiler has already been initialized, decision 605 branches to "no" branch 648 whereupon, at step 650, the mapping data is checked to determine whether the method being compiled was previously compiled. If the method was previously compiled and the pages storing the JITed code were reused by the operating system, then the method name and address range already exists in the mapping table. A determination is made as to whether the method is already mapped (decision 655). If the method is already mapped, decision 655 branches to "yes" branch 654 whereupon the previously allocated page addresses are retrieved (step 655) and the code is compiled to the allocated pages (step 660) before processing returns to the calling program (i.e., the error handler that called the JIT compiler when a page that used to store JITed code no longer the JITed code an, instead, contained an invalid opcode written to the page by the special filesystem) at 665.

Returning to decision 655, if the method is not already mapped (i.e., the method has not previously been compiled), decision 655 branches to "no" branch 668 whereupon, another determination is made as to whether more JIT address space is needed in order to compile the requested method (decision 670). If additional JIT address space is needed, decision 670 branches to "yes" branch 672 whereupon the amount of JIT address space is increased (predefined process 675, see FIG. 7 and corresponding text for processing details). If additional JIT address space is not needed, decision 670 branches to "no" branch 678 bypassing predefined process 675.

As described above, steps 680 through 690 are performed in order to allocate pages from the JIT address space, compile the method to the allocated pages, and write mapping data to record the method name that was compiled and the address range within the JIT address space used by the JIT-compiled method. Processing then returns to the calling routine (i.e., the virtual machine) at 695.

Figure 7:
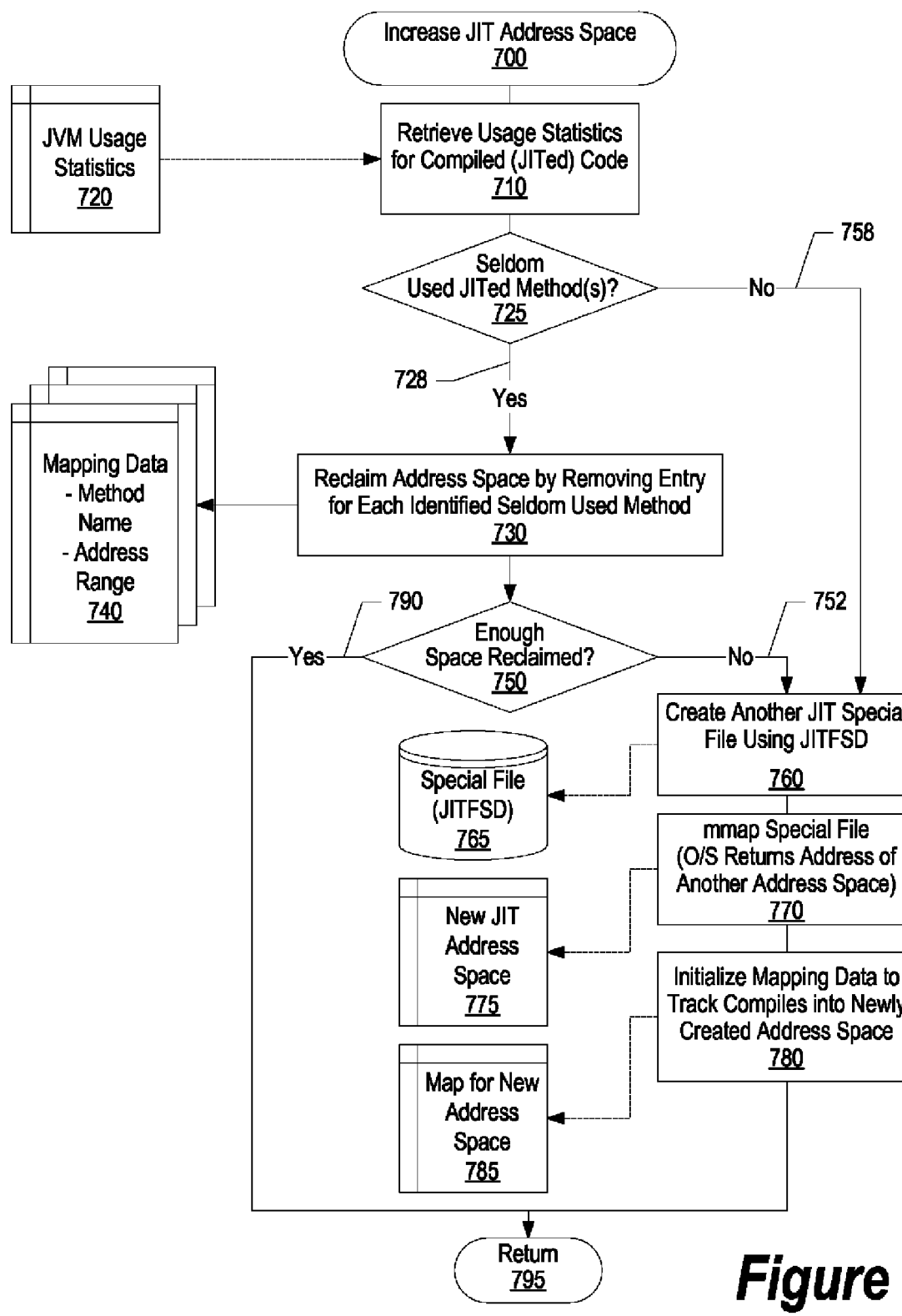
FIG. 7 is a flowchart showing steps taken to increase the amount of address space used to store compiled programs resulting from the JIT compiler.

FIG. 7 is a flowchart showing steps taken to increase the amount of address space used to store compiled programs resulting from the JIT compiler. The processing shown in FIG. 7 is called from predefined process 675 shown on FIG. 6. FIG. 7 processing commences at 700 whereupon, at step 710, usage statistics for JITed code are retrieved from usage statistics data store 720 maintained by the virtual machine (e.g., JVM).

A determination is made as to whether, based on the usage statistics, there are seldom used JITed methods that can be removed (decision 725). If there are seldom used JITed methods that can be removed, decision 725 branches to "yes" branch 728 whereupon, at step 730, the address space occupied by the seldom used methods is reclaimed by removing the entry for each seldom used method from mapping data tables 740. After the address space used by the seldom used methods has been reclaimed, a determination is made as to whether enough space has been reclaimed from the JITed code address space. If enough space has not been reclaimed, decision 750 branches to "no" branch 752 in order to allocate additional JITed code address space. On the other hand, if enough space has been reclaimed, decision 750 branches to "yes" branch 790 bypassing steps taken to allocate additional JITed code address space.

If either there were no seldom used JITed methods to remove (i.e., decision 725 branching to "no" branch 758) or enough address space for JITed code was not reclaimed by removing seldom used JITed code (i.e., decision 750 branching to "no" branch 752), then steps to provide additional address space for JITed code commence at step 760. At step 760, another JIT special file (file 765) is created using the special filesystem (JITFSD). At step 770, the special file that was created is memory mapped (mmap-ed), whereupon the operating system returns an address of address space 775 that is memory mapped to the newly created special file. At step 780, either a new map table 785 or the existing mapping table (see map 615 in FIG. 6) is initialized in order to inform the JIT compiler of the newly created JIT address space. The JIT compiler now manages the address space of the original JIT address space (see address space 645 in FIG. 6) as well as the newly created address space 775 to store compiled code resulting from the JIT compiler (JITed code). The space in both the original JIT address space and the newly created JIT address space can be reclaimed by the operating system when needed (see FIG. 8 for operating system memory reclamation details).

Processing thereafter returns to the calling program at 795. The calling routine being predefined process 675 shown in FIG. 6.

Figure 8:
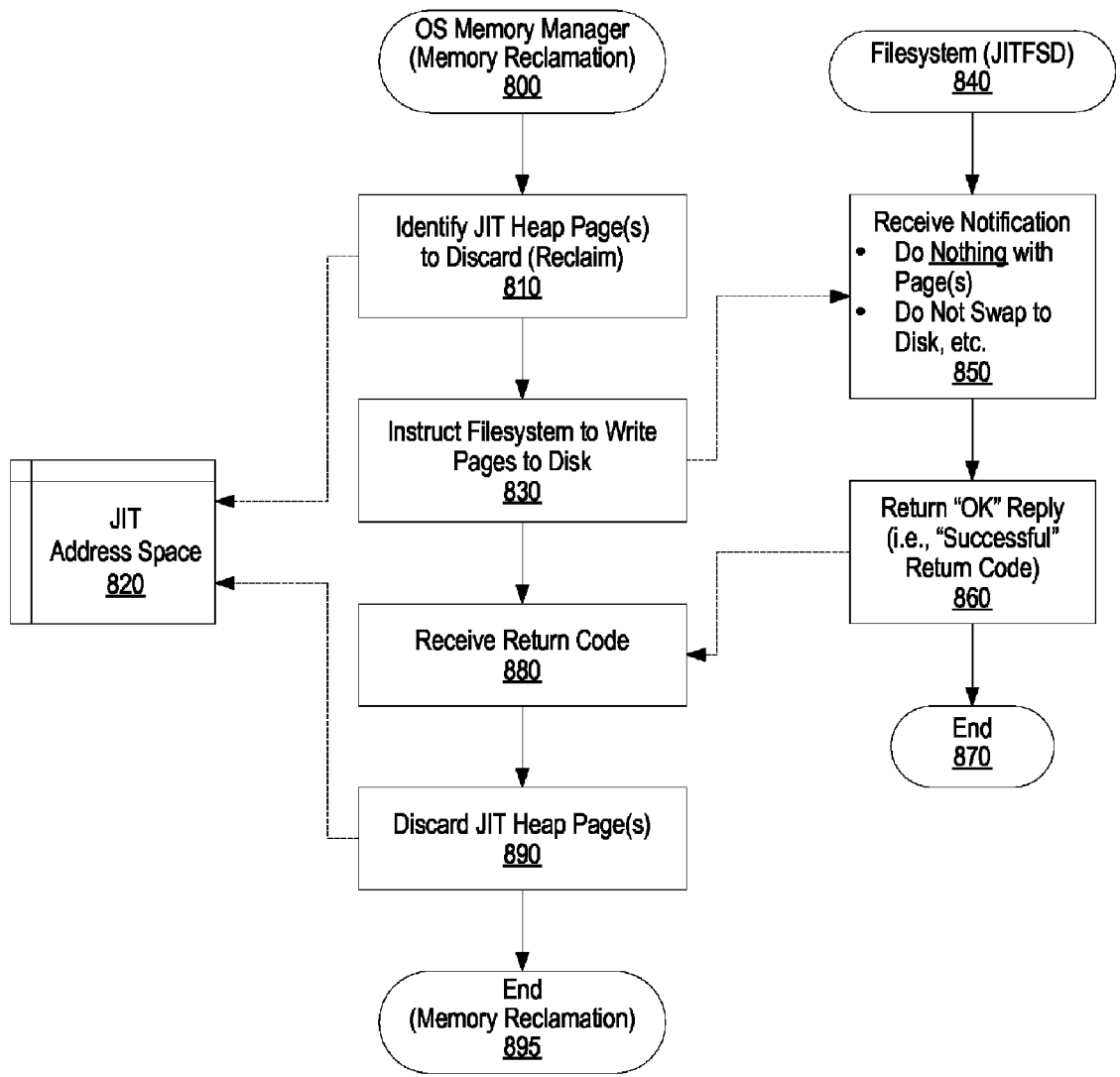
FIG. 8 is a flowchart showing the interaction between the operating system's memory manager (performing memory reclamation tasks) and a special filesystem that is used in conjunction with JITed code.

FIG. 8 is a flowchart showing the interaction between the operating system's memory manager (performing memory reclamation tasks) and a special filesystem that is used in conjunction with JITed code. The operating system, such as a Unix-based operating system, has a memory manager to manage memory. One aspect of memory management deals with reclaiming memory that is currently allocated for other processes. FIG. 8 shows how the memory reclamation routine of the operating system's memory manager identifies and reclaims memory currently being used to store JITed code.

Processing commences at 800 whereupon, at step 810, the operating system's memory manager identifies pages in the JIT memory area that to reclaim. One way in which the memory manager identifies pages to reclaim is by using a least recently used algorithm so that pages of memory that are not used as often are paged out before pages that are used more often. JITed address space 820 is the address space used by the JIT compiler to store compiled code resulting from the compiler (see FIG. 2, memory area 230, and corresponding text for further detail). These JITed pages are memory mapped to a file created using a special filesystem used for handling JIT compiled code pages (see FIGS. 5-7 and corresponding text for details regarding the creation of the JIT address space by memory mapping a file maintained by the special filesystem).

The operating system notes that pages within JIT address space 820 are memory mapped to a file maintained by the special filesystem using read-write memory mapping. Because read-write memory mapping was used to map the file, the operating system instructs the filesystem, in this case the special filesystem, to write the pages that are about to be discarded before the operating system's memory manager discards the pages. At step 830, the memory manager instructs the special filesystem to write the pages that are about to be discarded and reclaimed by the operating system to nonvolatile storage.

Special filesystem processing commences at 840 whereupon, at step 850, the special filesystem receives the request from the operating system. The special filesystem does not actually maintain a file in nonvolatile storage that includes the data from the JIT address space. Instead, the memory mapping was used so that the operating system interfaces with the special filesystem to handle page faults and other file actions pertaining to the JIT address space. The special filesystem, therefore, does not do anything with the pages in response to the request and does not write any of the data to disk. However, the special filesystem, at step 860, returns a response to the operating system indicating that the pages were successfully written to nonvolatile storage, clearing the way for the operating system to discard the pages and reuse the memory space. Special filesystem processing of the "write" request then ends at 870.

Returning to operating system processing, at step 880, the operating system's memory manager receives the completion code from the special filesystem indicating that the pages were successfully written to nonvolatile storage. In response to receiving the successful completion response, at step 890, the memory manager discards the identified pages from the JIT address space and is able to reuse the memory for another application. Operating system memory reclamation processing thereafter ends at 895.

Figure 9:
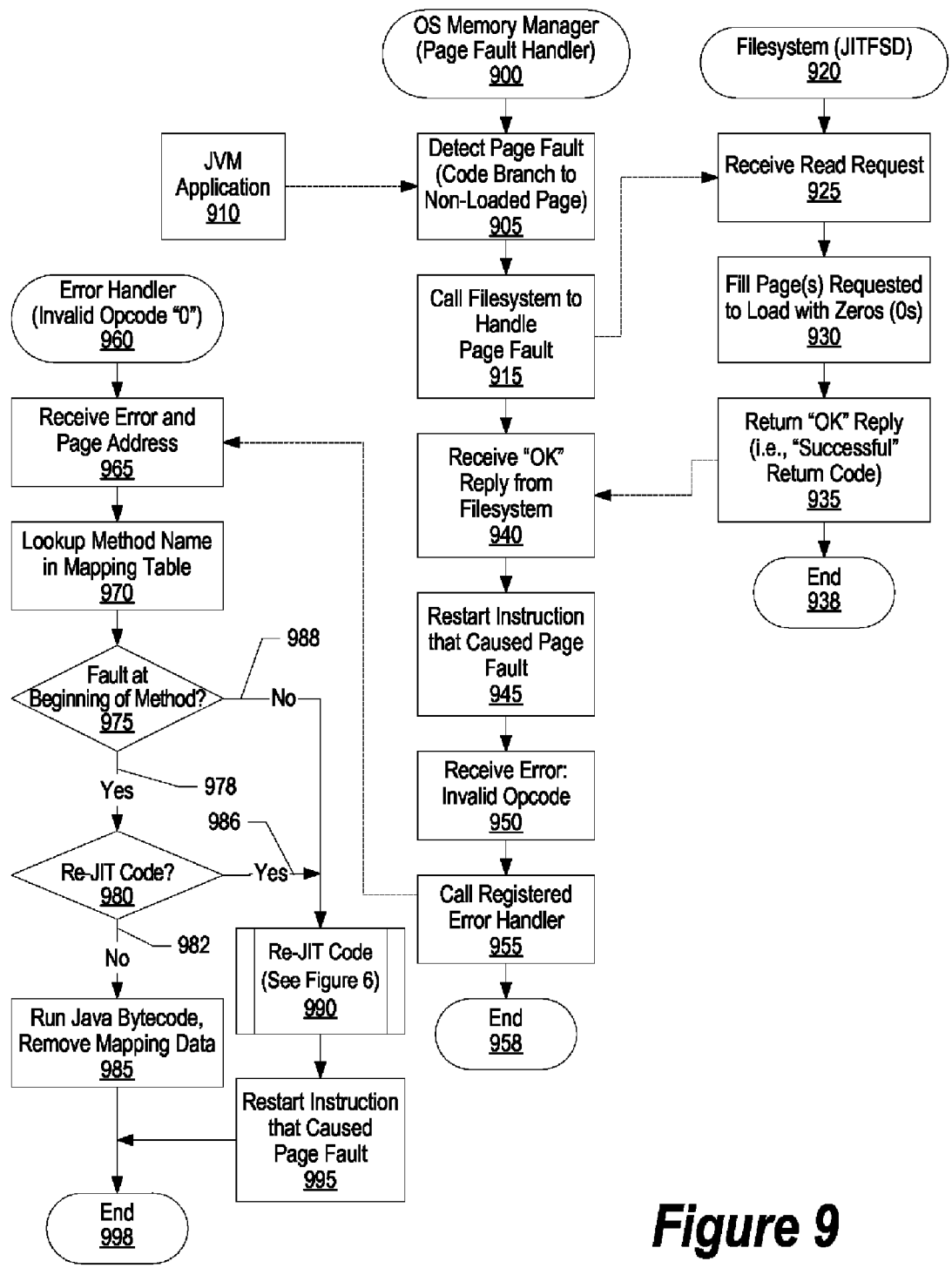
FIG. 9 is a flowchart showing interaction between the operating system's memory manager (performing page fault handling), the special filesystem that is used in conjunction with JITed code, and an error handler that is used to reload code that was removed from memory during a prior memory reclamation task.

FIG. 9 is a flowchart showing interaction between the operating system's memory manager (performing page fault handling), the special filesystem that is used in conjunction with JITed code, and an error handler that is used to reload code that was removed from memory during a prior memory reclamation task. After a page containing JITed code has been reclaimed by the operating system's memory manager (see FIG. 8 for details), the code that used to reside in the discarded pages can still be called (i.e., branched to) by another process or code instruction that is currently being executed, such as JVM method 910. When a branch is made to an address within a discarded page, a page fault results. The operating system's page fault handler commences at 900, whereupon at step 905, the page fault is detected.

At step 915, the page fault handler calls the special filesystem and instructs the special filesystem to load the pages. Special filesystem processing of the load request commences at 920 whereupon, at step 925, the special filesystem receives the load request from the page fault handler. The request includes the address of the page or pages that the page fault handler needs to have loaded by the special filesystem. Because the special filesystem did not write the code to nonvolatile storage when the memory manager discarded the pages (see FIG. 8 and corresponding text for details), the special filesystem does not have the data needed to load the pages. Instead, at step 930, the special filesystem writes an invalid operation code (opcode), or a series of the same invalid opcode, to the page or pages that the page fault handler is requesting to have loaded. After writing the invalid opcode to the page(s), at step 935, the special filesystem replies with returns with a successful completion code indicating that the page(s) were successfully loaded. Special filesystem processing of the load request thereafter ends at 938.

Returning to the page fault handler, at step 940 the page fault handler receives the response from the special filesystem indicating that page(s) were successfully loaded (even though the page(s) were not actually loaded and an invalid opcode was actually written to the page(s)). At step 945, the operating system attempts to restart the instruction that caused the page fault to occur. This time, however, the page contains an invalid opcode which results in an invalid operation exception that occurs in response to restarting the instruction and is detected at step 950. When the JIT compiler was initialized, an error handler was registered with the operating system to handle the invalid opcode (see FIG. 6, step 625, and corresponding text for details regarding the initialization of the error handler). At step 955, the operating system calls the registered error handler in order to handle the invalid opcode. Processing of the page fault handler thereafter ends at 958.

Error handler processing commences at 960 whereupon, at step 965, the error handler receives the error and the page address where the error occurred. At step 970, the error handler retrieves the method name that corresponds to the page address from the mapping data table(s). A determination is made, at decision 975 as to whether the page fault occurred at the beginning of the method (i.e., the fault address being the same as the starting address for the method). If the fault occurred at the beginning of the method, decision 975 branches to "yes" branch 978 whereupon the virtual machine can determine whether to recompile the code using the JIT compiler or interpret the code (decision 980). For example, the code may have been extensively used during shortly after the virtual machine was initialized, but hardly used thereafter. Using this example, the virtual machine may decide to interpret the code instead of re-compiling it. If the virtual machine decides not to recompile the code, decision 980 branches to "no" branch 982 whereupon, at step 985, the interpretable version of the code is executed using the virtual machine's interpreter and the mapping data corresponding to the method is removed to indicate that a JIT compiled version of the code is no longer being maintained in the JIT address space.

If either (1) the faulting address was not at the beginning of the method (i.e., decision 975 branching to "no" branch 988), or (2) the virtual machine decided to recompile the code even though the fault occurred at the beginning of the method (i.e., decision 980 branching to "yes" branch 986), then the method is recompiled using the JIT compiler (predefined process 990, see FIG. 6 steps 655-665 and corresponding text for processing details). When the code has been recompiled, at step 995, the instruction that caused the page fault is restarted. This time, because the code was recompiled into the same address space, the address contains a valid instruction allowing the compiled method to restarted.

Figure 10:
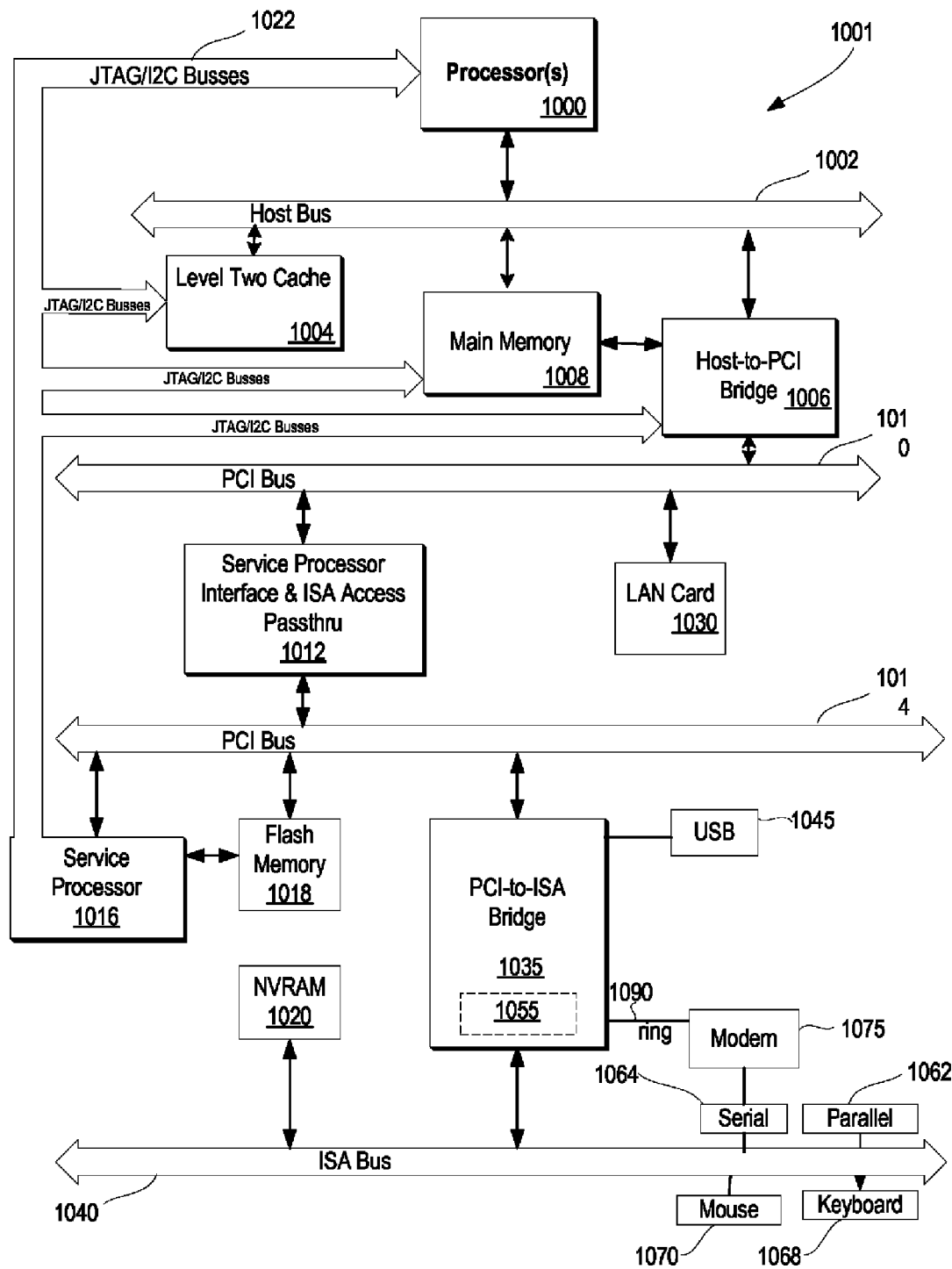
FIG. 10 is a block diagram of an information handling system capable of implementing the present invention.

FIG. 10 illustrates information handling system 1001 which is a simplified example of a computer system capable of performing the computing operations described herein. Computer system 1001 includes processor 1000 which is coupled to host bus 1002. A level two (L2) cache memory 1004 is also coupled to host bus 1002. Host-to-PCI bridge 1006 is coupled to main memory 1008, includes cache memory and main memory control functions, and provides bus control to handle transfers among PCI bus 1010, processor 1000, L2 cache 1004, main memory 1008, and host bus 1002. Main memory 1008 is coupled to Host-to-PCI bridge 1006 as well as host bus 1002. Devices used solely by host processor(s) 1000, such as LAN card 1030, are coupled to PCI bus 1010. Service Processor Interface and ISA Access Pass-through 1012 provides an interface between PCI bus 1010 and PCI bus 1014. In this manner, PCI bus 1014 is insulated from PCI bus 1010. Devices, such as flash memory 1018, are coupled to PCI bus 1014. In one implementation, flash memory 1018 includes BIOS code that incorporates the necessary processor executable code for a variety of low-level system functions and system boot functions.

PCI bus 1014 provides an interface for a variety of devices that are shared by host processor(s) 1000 and Service Processor 1016 including, for example, flash memory 1018. PCI-to-ISA bridge 1035 provides bus control to handle transfers between PCI bus 1014 and ISA bus 1040, universal serial bus (USB) functionality 1045, power management functionality 1055, and can include other functional elements not shown, such as a real-time clock (RTC), DMA control, interrupt support, and system management bus support. Nonvolatile RAM 1020 is attached to ISA Bus 1040. PCI-to-SCSI bridge 1080 provides bus control to handle transfers between PCI bus 1014 and SCSI bus 1085. SCSI device 1090 (i.e. a SCSI hard drive) communicates with other parts of computer system 1001 using SCSI bus 1085.

Service Processor 1016 includes JTAG and I2C busses 1022 for communication with processor(s) 1000 during initialization steps. JTAG/I2C busses 1022 are also coupled to L2 cache 1004, Host-to-PCI bridge 1006, and main memory 1008 providing a communications path between the processor, the Service Processor, the L2 cache, the Host-to-PCI bridge, and the main memory. Service Processor 1016 also has access to system power resources for powering down information handling device 1001.

Peripheral devices and input/output (I/O) devices can be attached to various interfaces (e.g., parallel interface 1062, serial interface 1064, keyboard interface 1068, and mouse interface 1070 coupled to ISA bus 1040. Alternatively, many I/O devices can be accommodated by a super I/O controller (not shown) attached to ISA bus 1040.

In order to attach computer system 1001 to another computer system to copy files over a network, LAN card 1030 is coupled to PCI bus 1010. Similarly, to connect computer system 1001 to an ISP to connect to the Internet using a telephone line connection, modem 1075 is connected to serial port 1064 and PCI-to-ISA Bridge 1035.

While the computer system described in FIG. 10 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method of performing just-in-time (JIT) compilations, said method comprising initializing a JIT compiler, the initializing including:
   initializing a mapping table, wherein the mapping table is used to track JIT compilations performed by the JIT compiler;
   initializing a special filesystem that is used for memory mapping JIT compiled code, wherein the special filesystem responds to requests received from an operating system by:
      responding to a load request to load a page by writing one or more invalid opcodes to the page and by returning a first successful completion code to the operating system; and
      responding to a write request to write one or more pages from memory to a nonvolatile storage device by returning a second successful return completion code to the operating system without writing the one or more pages to the nonvolatile storage device;
   registering an error handler with the operating system, wherein the error handler is called by the operating system when the invalid opcode is encountered; and
   creating a special file using the special filesystem, wherein the special file is memory mapped to an address space, and wherein the address space is used to store JIT compiled code resulting from the JIT compiler compiling a plurality of methods.

2. The method of claim 1 further comprising:
   detecting, by the operating system, an instruction that causes a page fault resulting from a branch to a non-loaded page of memory;
   requesting the special filesystem to handle the page fault;
   receiving, at the special filesystem, the request to handle the page fault, wherein the special filesystem responds by writing the one or more invalid opcodes to one or more first addresses within a first address range within the address space, the first address range corresponding to the non-loaded page, and the special filesystem returns the first successful completion code to the operating system;
   restarting, by the operating system, the instruction that caused the page fault, the restarting resulting in an invalid opcode error due to the one or more invalid opcodes written by the special filesystem to the first addresses; and
   calling, by the operating system, the registered error handler in response to the invalid opcode error, wherein the error handler operates by:
      loading a plurality of instructions in the first address range within the address space, the loading overwriting the invalid opcodes stored a the first addresses; and
      restarting the instruction that caused the page fault, the restarting resulting in execution of the loaded instructions.

3. The method of claim 2 wherein the loading of the plurality of instructions by the error handler further comprises:
   receiving a page address of the non-loaded page;
   identifying a method name from a plurality of method names stored in the mapping table, wherein the identified method name corresponds to the page address; and
   writing the plurality of instructions to the first address range, wherein the plurality of instructions correspond to a method corresponding to the identified method name, and wherein the writing overwrites the one or more invalid opcodes previously written to the one or more first addresses.

4. The method of claim 3 further comprising:
   determining whether the page fault occurred at the beginning of the method, wherein the writing of the plurality of instructions is performed by JIT compilation when the page fault does not occur at the beginning of the method;
   analyzing usage statistics corresponding to the method in response to the page fault occurring at the beginning of the method;
   in response to the analysis revealing a high usage of the method:
      performing the JIT compilation, wherein the JIT compilation results in the writing of the plurality of instructions; and
   in response to the analysis revealing a lower usage of the method:
      loading bytecode instructions into the first address range; and
      removing the identified method name from the mapping table.

5. The method of claim 1 further comprising:
   identifying, at a memory manager, a heap page to discard from memory, wherein the identified heap page is being managed by the special filesystem;
   instructing the special filesystem to write the identified heap page to a nonvolatile storage device;
   in response to receiving the instruction at the special filesystem, returning the second successful completion code from the special file system to the memory manager, wherein the special filesystem does nothing with the heap page after receiving the instruction and before returning the second successful completion code;
   receiving, at the memory manager, the second successful completion code; and
   discarding, by the memory manager, the heap page in response to receiving the second successful completion code.

6. The method of claim 1 further comprising:
   determining that additional address space is needed to store additional JIT compiled code, wherein the additional JIT compiled code corresponds to one or more additional methods, and wherein the mapping table lists each method currently stored in the special file along with each method's address range;
   analyzing usage statistics corresponding to the JIT code currently stored in the special file;
   identifying one or more methods corresponding to seldom used JIT code; and
   reclaiming address space from the special file by removing an entry corresponding to each of the identified seldom used methods from the mapping table.

7. The method of claim 6 further comprising:
   in response to determining that the special file is too small to store the additional JIT compiled code:
      creating a secondary special file using the special file system;
      memory mapping the secondary special file;

receiving, from the operating system, a secondary address space resulting from the memory mapping; and initializing a secondary mapping table used to track the additional JIT compiled code stored in the secondary special file.

8. An information handling system comprising:

one or more processors;

a memory accessible by the processors;

a nonvolatile storage device accessible by the processors that includes one or more Java executable images, the Java executable images including a read-only section;

a just-in-time (JIT) compilation tool, the tool including software code that, when executed by the processors, performs steps that include:

initializing a JIT compiler, the initializing including:

initializing a mapping table, wherein the mapping table is used to track JIT compilations performed by the JIT compiler;

initializing a special filesystem that is used for memory mapping JIT compiled code, wherein the special filesystem responds to requests received from an operating system by:

responding to a load request to load a page by writing one or more invalid opcodes to the page and by returning a first successful completion code to the operating system; and responding to a write request to write one or more pages from memory to a nonvolatile storage device by returning a second successful return completion code to the operating system without writing the one or more pages to the nonvolatile storage device;

registering an error handler with the operating system, wherein the error handler is called by the operating system when the invalid opcode is encountered; and creating a special file using the special filesystem, wherein the special file is memory mapped to an address space, and wherein the address space is used to store JIT compiled code resulting from the JIT compiler compiling a plurality of methods.

9. The information handling system of claim 8 wherein the software code, when executed by the processors, performs further steps comprising:

detecting, by the operating system, an instruction that causes a page fault resulting from a branch to a non-loaded page of memory;

requesting the special filesystem to handle the page fault;

receiving, at the special filesystem, the request to handle the page fault, wherein the special filesystem responds by writing the one or more invalid opcodes to one or more first addresses within a first address range within the address space, the first address range corresponding to the non-loaded page, and the special filesystem returns the first successful completion code to the operating system;

restarting, by the operating system, the instruction that caused the page fault, the restarting resulting in an invalid opcode error due to the one or more invalid opcodes written by the special filesystem to the first addresses; and calling, by the operating system, the registered error handler in response to the invalid opcode error, wherein the error handler operates by:

loading a plurality of instructions in the first address range within the address space, the loading overwriting the invalid opcodes stored a the first addresses; and restarting the instruction that caused the page fault, the restarting resulting in execution of the loaded instructions.

10. The information handling system of claim 9 wherein the loading of the plurality of instructions by the error handler further comprises:

receiving a page address of the non-loaded page;

identifying a method name from a plurality of method names stored in the mapping table, wherein the identified method name corresponds to the page address; and writing the plurality of instructions to the first address range, wherein the plurality of instructions correspond to a method corresponding to the identified method name, and wherein the writing overwrites the one or more invalid opcodes previously written to the one or more first addresses.

11. The information handling system of claim 10 wherein the software code, when executed by the processors, performs further steps comprising:

determining whether the page fault occurred at the beginning of the method, wherein the writing of the plurality of instructions is performed by JIT compilation when the page fault does not occur at the beginning of the method;

analyzing usage statistics corresponding to the method in response to the page fault occurring at the beginning of the method;

in response to the analysis revealing a high usage of the method:

performing the JIT compilation, wherein the JIT compilation results in the writing of the plurality of instructions; and in response to the analysis revealing a lower usage of the method:

loading bytecode instructions into the first address range; and removing the identified method name from the mapping table.

12. The information handling system of claim 8 wherein the software code, when executed by the processors, performs further steps comprising:

identifying, at a memory manager, a heap page to discard from memory, wherein the identified heap page is being managed by the special filesystem;

instructing the special filesystem to write the identified heap page to a nonvolatile storage device;

in response to receiving the instruction at the special filesystem, returning the second successful completion code from the special file system to the memory manager, wherein the special filesystem does nothing with the heap page after receiving the instruction and before returning the second successful completion code;

receiving, at the memory manager, the second successful completion code; and discarding, by the memory manager, the heap page in response to receiving the second successful completion code.

13. The information handling system of claim 8 wherein the software code, when executed by the processors, performs further steps comprising:

determining that additional address space is needed to store additional JIT compiled code, wherein the additional JIT compiled code corresponds to one or more additional methods, and wherein the mapping table lists each method currently stored in the special file along with each method's address range;

analyzing usage statistics corresponding to the JIT code currently stored in the special file;

identifying one or more methods corresponding to seldom used JIT code;

reclaiming address space from the special file by removing an entry corresponding to each of the identified seldom used methods from the mapping table; and in response to determining that the special file is too small to store the additional JIT compiled code:

creating a secondary special file using the special file system;

memory mapping the secondary special file;

receiving, from the operating system, a secondary address space resulting from the memory mapping; and initializing a secondary mapping table used to track the additional JIT compiled code stored in the secondary special file.

14. A computer program product that includes software code encoded in a computer readable memory that, when executed by an information handling system, causes the information handling system to perform steps comprising:

initializing a mapping table, wherein the mapping table is used to track JIT compilations performed by the JIT compiler;

initializing a special filesystem that is used for memory mapping JIT compiled code, wherein the special filesystem responds to requests received from an operating system by:

responding to a load request to load a page by writing one or more invalid opcodes to the page and by returning a first successful completion code to the operating system; and responding to a write request to write one or more pages from memory to a nonvolatile storage device by returning a second successful return completion code to the operating system without writing the one or more pages to the nonvolatile storage device;

registering an error handler with the operating system, wherein the error handler is called by the operating system when the invalid opcode is encountered; and creating a special file using the special filesystem, wherein the special file is memory mapped to an address space, and wherein the address space is used to store JIT compiled code resulting from the JIT compiler compiling a plurality of methods.

15. The computer program product of claim 14 wherein the software code causes the information handling system to perform further steps comprising:

detecting, by the operating system, an instruction that causes a page fault resulting from a branch to a non-loaded page of memory;

requesting the special filesystem to handle the page fault;

receiving, at the special filesystem, the request to handle the page fault, wherein the special filesystem responds by writing the one or more invalid opcodes to one or more first addresses within a first address range within the address space, the first address range corresponding to the non-loaded page, and the special filesystem returns the first successful completion code to the operating system;

restarting, by the operating system, the instruction that caused the page fault, the restarting resulting in an invalid opcode error due to the one or more invalid opcodes written by the special filesystem to the first addresses; and calling, by the operating system, the registered error handler in response to the invalid opcode error, wherein the error handler operates by:

loading a plurality of instructions in the first address range within the address space, the loading overwriting the invalid opcodes stored a the first addresses; and restarting the instruction that caused the page fault, the restarting resulting in execution of the loaded instructions.

16. The computer program product of claim 15 wherein the software code that performs the loading of the plurality of instructions by the error handler performs further steps comprising:

receiving a page address of the non-loaded page;

identifying a method name from a plurality of method names stored in the mapping table, wherein the identified method name corresponds to the page address; and writing the plurality of instructions to the first address range, wherein the plurality of instructions correspond to a method corresponding to the identified method name, and wherein the writing overwrites the one or more invalid opcodes previously written to the one or more first addresses.

17. The computer program product of claim 16 wherein the software code causes the information handling system to perform further steps comprising:

determining whether the page fault occurred at the beginning of the method, wherein the writing of the plurality of instructions is performed by JIT compilation when the page fault does not occur at the beginning of the method;

analyzing usage statistics corresponding to the method in response to the page fault occurring at the beginning of the method;

in response to the analysis revealing a high usage of the method:

performing the JIT compilation, wherein the JIT compilation results in the writing of the plurality of instructions; and in response to the analysis revealing a lower usage of the method:

loading bytecode instructions into the first address range; and removing the identified method name from the mapping table.

18. The computer program product of claim 14 wherein the software code causes the information handling system to perform further steps comprising:

identifying, at a memory manager, a heap page to discard from memory, wherein the identified heap page is being managed by the special filesystem;

instructing the special filesystem to write the identified heap page to a nonvolatile storage device;

in response to receiving the instruction at the special filesystem, returning the second successful completion code from the special file system to the memory manager, wherein the special filesystem does nothing with the heap page after receiving the instruction and before returning the second successful completion code;

receiving, at the memory manager, the second successful completion code; and discarding, by the memory manager, the heap page in response to receiving the second successful completion code.

19. The computer program product of claim 14 wherein the software code causes the information handling system to perform further steps comprising:
- determining that additional address space is needed to store additional JIT compiled code, wherein the additional JIT compiled code corresponds to one or more additional methods, and wherein the mapping table lists each method currently stored in the special file along with each method's address range;
- analyzing usage statistics corresponding to the JIT code currently stored in the special file;
- identifying one or more methods corresponding to seldom used JIT code; and
- reclaiming address space from the special file by removing an entry corresponding to each of the identified seldom used methods from the mapping table.

20. The computer program product of claim 19 wherein the software code causes the information handling system to perform further steps comprising:
- in response to determining that the special file is too small to store the additional JIT compiled code:
  - creating a secondary special file using the special file system;
  - memory mapping the secondary special file;
  - receiving, from the operating system, a secondary address space resulting from the memory mapping; and
  - initializing a secondary mapping table used to track the additional JIT compiled code stored in the secondary special file.

* * * * *